(12) United States Patent  
Chang et al.

(10) Patent No.: US 7,990,665 B2  
(45) Date of Patent: Aug. 2, 2011

(54) ELECTRO-MAGNETIC PULSE PROTECTION CIRCUIT WITH A COUNTER

(75) Inventors: Liann-Be Chang, Tao-Yuan (TW); Ming-Jer Jeng, Tao-Yuan (TW); Yu-Lin Lee, Tao-Yuan (TW)

(73) Assignee: Chang Gung University, Tao-Yuan (TW)

( * ) Notice: Subject to any disclaimer, the term of this patent is extended or adjusted under 35 U.S.C. 154(b) by 629 days.

(21) Appl. No.: 12/139,554

(22) Filed: Jun. 16, 2008

(65) Prior Publication Data

US 2009/0237848 A1   Sep. 24, 2009

(30) Foreign Application Priority Data

Mar. 18, 2008 (TW) ................................ 97109543 A

(51) Int. Cl.  
*H02H 9/00* (2006.01)

(52) U.S. Cl. .......................................................... 361/56
(58) Field of Classification Search ...................... 361/56  
See application file for complete search history.

(56) References Cited

U.S. PATENT DOCUMENTS 3,723,820 A * 3/1973 Brown ............................. 361/57

* cited by examiner

*Primary Examiner* — Stephen W Jackson  
(74) *Attorney, Agent, or Firm* — Ming Chow; Sinorica, LLC

(57) ABSTRACT

An EMP protection circuit with a counter has a surge protection circuit capable of suppressing EMP, and also use an extra counting circuit for sensing light emission or variation of magnetic force of the surge protection circuit to count the action times of the surge protection circuit, thereby warning that the surge protection circuit has reached its time-limit of use and has to be replaced. In this way, various kinds of electronic products can be more perfectly protected to avoid higher loss.

24 Claims, 7 Drawing Sheets

ELECTRO-MAGNETIC PULSE PROTECTION CIRCUIT WITH A COUNTER

BACKGROUND OF THE INVENTION

1. Field of the Invention

The present invention relates to an electromagnetic pulse protection circuit capable of suppressing fast and slow over-voltage surges caused by electromagnetic pulse and, more particularly, to an electromagnetic pulse protection circuit with a counter.

2. Description of Related Art

Because of high voltage, large current and very fast rise speed of electromagnetic pulse (EMP), a lightning arrester is generally provided before an existent communication electronic device. The lightning arrester is a slow lightning EMP (LEMP) protector, and is usually composed of spark gap switches or zinc oxide elements. The LEMP protector has a slower response time, and usually starts suppressing just after the surge voltage is very high. Therefore, the LEMP protector has no protection capability for fast-rise pulses.

A fast electrostatic discharge (ESD) protector (e.g., TVS, DIAC, or MOV) is generally provided after an IC. Although a fast response protector has a very fast response and can endure a voltage as high as 8000 V, but cannot resist a large current. Especially, lightning or a man-made EMP bomb produces a wider pulse. An over voltage for a long time will generate the current effect and also produces much heat to first burn out the ESD (fast response protector) and then the internal structure of the semiconductor device. Therefore, a fast response protector can only endure electrostatic discharge but cannot resist the attack of various EMPs with large energy.

A lightning arrester (LEMP protector) is generally provided before an existent communication electronic device, and a fast electrostatic discharge protection device (ESD protector) is generally provided after an IC. Nevertheless, the above problems cannot be solved by directly shunting the LEMP protector and the fast response protector. This is because the current will first flow to the fast response protector having a small current resistance until the fast response protector burns out, and the voltage rises again to burn out the IC equipment after the LEMP protector before the LEMP is activated. Besides, because all fast response protectors are capacitive reactance elements, they will cause insertion loss of input signals of communication equipments to affect the communication distance.

The applicant has disclosed a solution in Taiwan Pat. No. 588,888. As shown in FIG. 1, an EMP protection circuit is formed by connecting a resistive element 42 between a fast response protector 43 and an LEMP protector 41 and also series connecting an insertion loss compensating element 44 below the fast response protector 43. Because the fast response protector is capacitive, bad discharge of fast surge will happen at middle frequencies, and a band-stop effect will be generated at higher frequencies, hence being detrimental to wide band frequency-hopping applications. Therefore, the applicant has subsequently disclosed a novel EMP protection circuit, in which the insertion loss of the fast response protector 43 is further compensated or the architecture of the fast response protector 43 is changed, as shown in FIG. 2. Moreover, a voltage variable capacitive reactance element 46 can be series connected on the signal path between a surge protection circuit 45 and a protected circuit 47, as shown in FIG. 3, to effectively remove damage to electronic elements caused by EMP.

To accomplish perfect EMP protection, how to ensure that the EMP protection circuit can effectively operate is very important. In practice, however, it is easy to forget checking whether the EMP protection circuit has exceeded its time-limit of use. All the above prior arts lack human-based design and thus may cause hazards as a result of overdue use.

SUMMARY OF THE INVENTION

Accordingly, an object of the present invention is to provide an EMP protection circuit with a counter, in which a counting circuit detects the action of a surge protection circuit and counts the times so as to remind the operator of the right time of replacement, thereby avoiding the occurrence of hazards and harms and also accomplish intact EMP protection.

To achieve the above object, the present invention discloses an EMP protection circuit with a counter, which is composed of an LEMP protection circuit and a fast response protection circuit, and a counting circuit is disposed at a detection position of the LEMP protection circuit for detection of light emission or variation of magnetic force to count the action times of the LEMP protection circuit. The fast response protection circuit can be formed by series connecting ESD elements to reduce insertion loss, or by series connecting capacitive compensating elements. At higher frequencies, ESD elements can be directly saved to form a high pass circuit. The EMP protection circuit with a counter of the present invention can further be series connected to a capacitive reactance element. The capacitive reactance element is a varactor whose capacitance varies with input voltage. Normally, the varactor has a high capacitance and thus a small impedance. When a strong over-voltage EMP occurs, the varactor has a low capacitance thus a high impedance. Signal coupling is therefore impeded to ensure that the surge pulse does not damage electronic elements.

The EMP protection circuit with a counter of the present invention can also be formed by series connecting a resistive element between the LEMP protection circuit and the fast response protection circuit and providing a counting circuit to count the action times of the LEMP protection circuit. The fast response protection circuit can be formed by series connecting ESD elements or by series connecting an ESD element and a compensating element. A capacitive reactance element is also series connected between the fast response protection circuit and the LEMP protection circuit. The capacitive reactance element can be a varactor to achieve the effect of protecting electronic elements from EMP damage.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
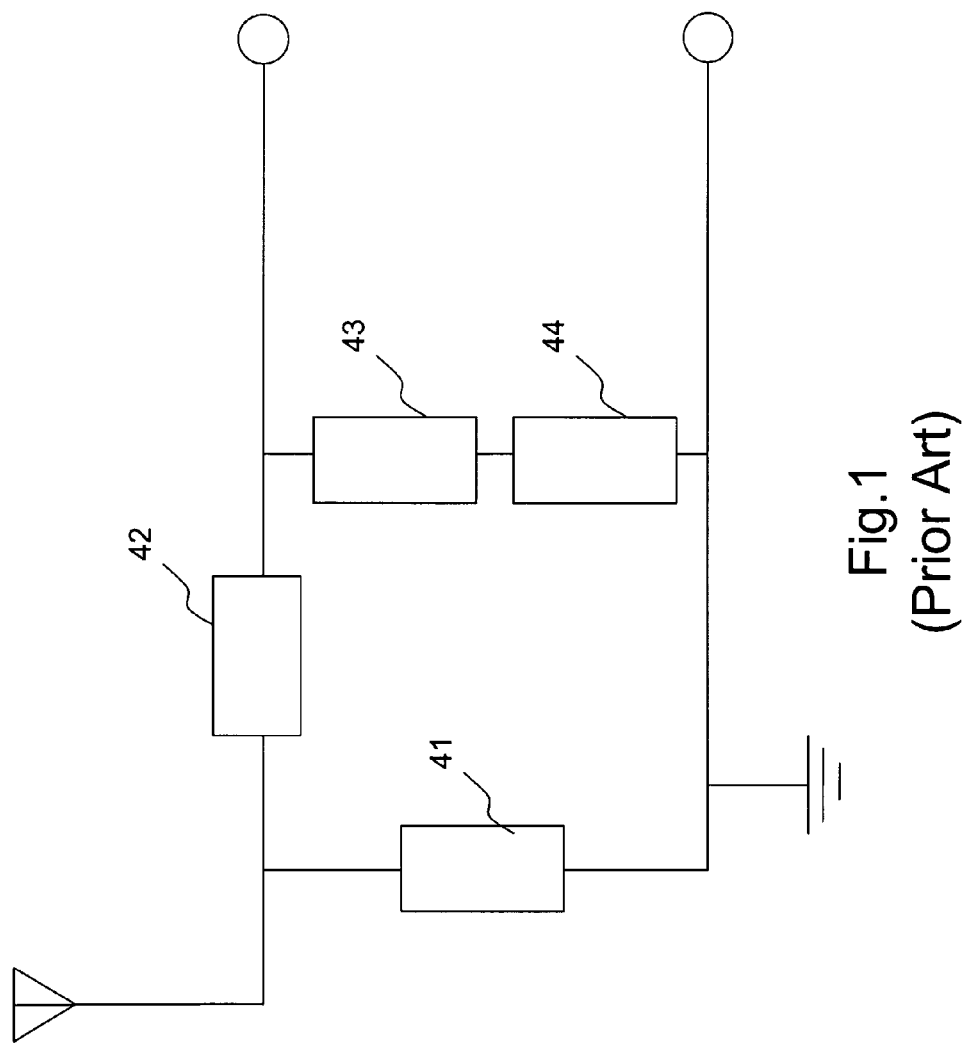
FIG. 1 is a surge suppression circuit diagram of an EMP protection circuit in the prior art.
Figure 2:
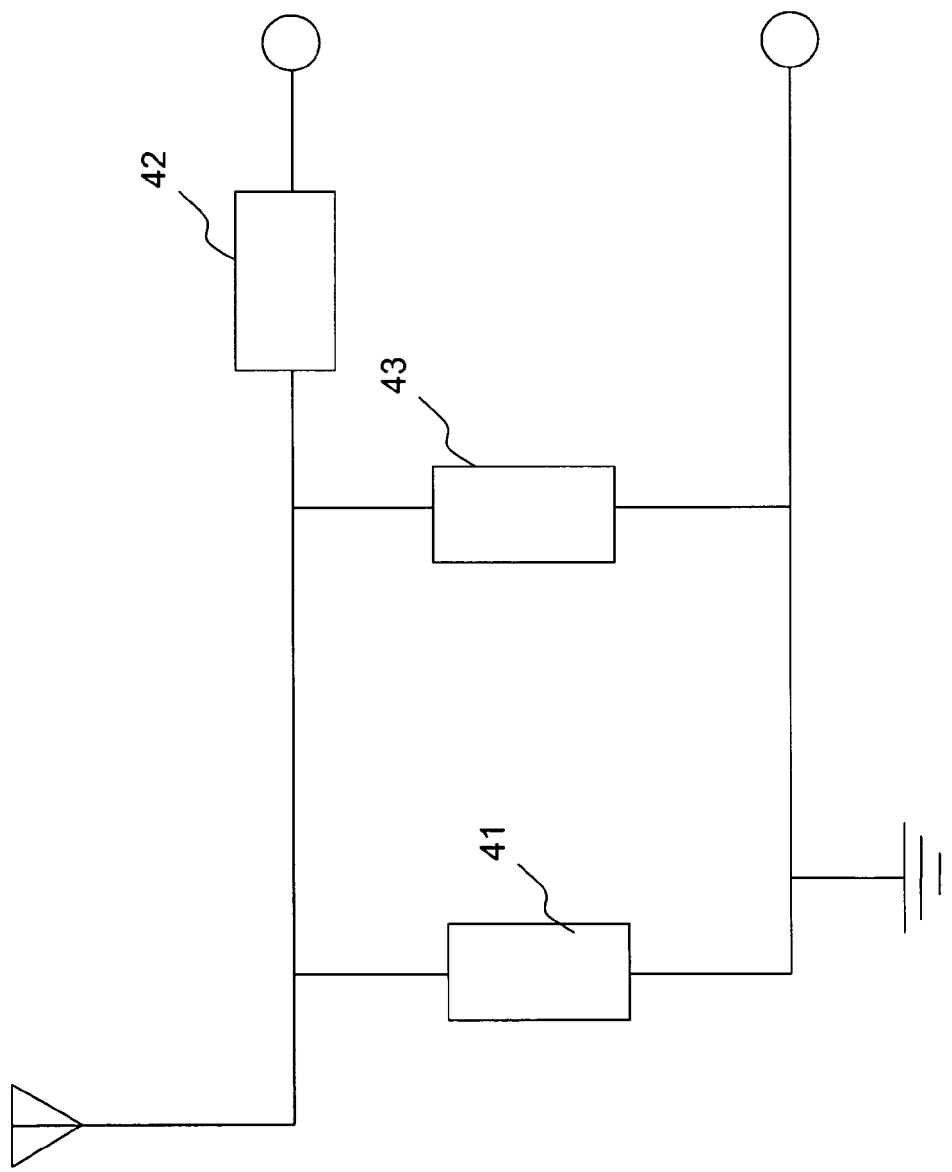
FIG. 2 is a surge suppression circuit diagram of another EMP protection circuit in the prior art.
Figure 3:
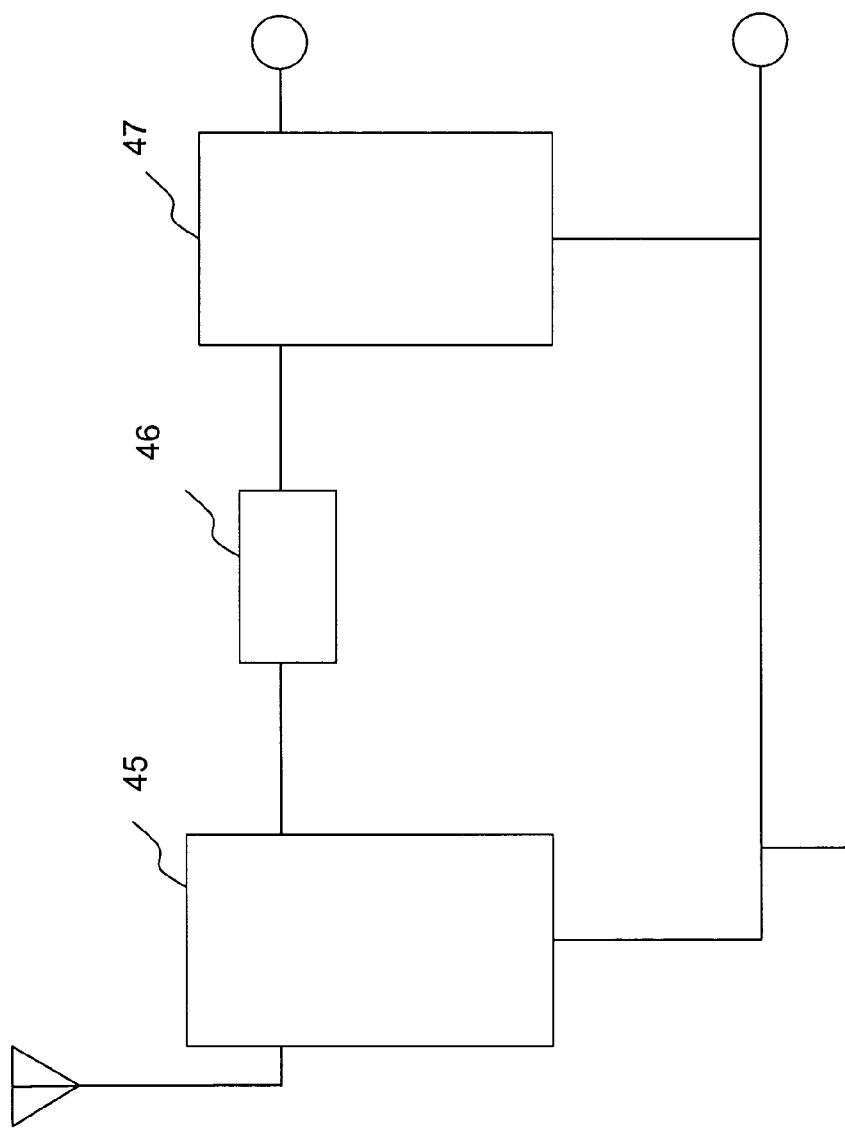
FIG. 3 is a surge suppression circuit diagram of yet another EMP protection circuit in the prior art.
Figure 4:
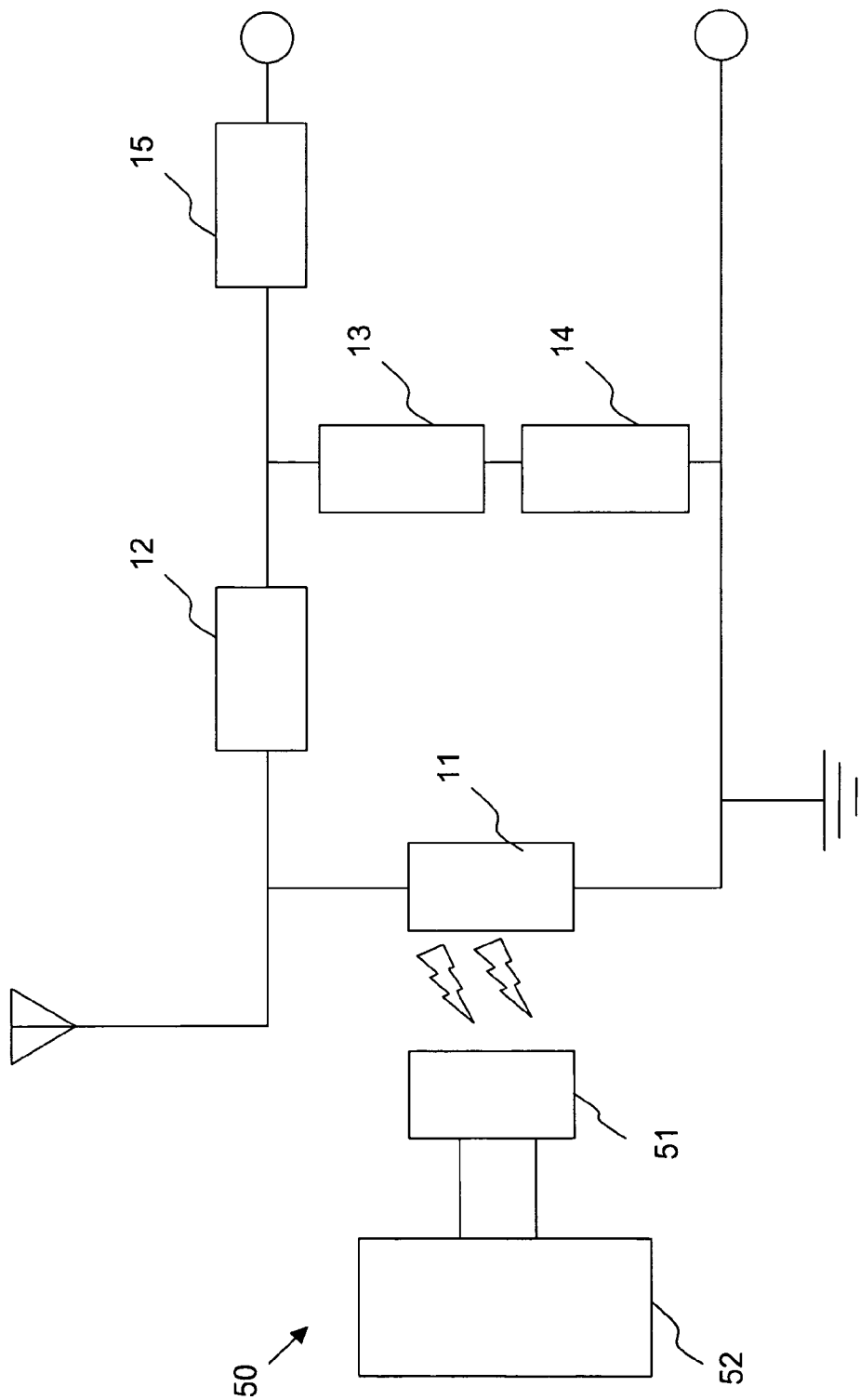
FIG. 4 is a surge suppression circuit diagram of an EMP protection circuit according to a first embodiment of the present invention.

FIG. 4 is a surge suppression circuit diagram of an EMP protection circuit according to a first embodiment of the present invention. Reference is made to FIG. 4. A resistive element 12 is series connected between a fast response protection circuit 13 and an LEMP protection circuit 11, and a counting circuit 50 is disposed at a detection position of the LEMP protector 11. The counting circuit 50 includes a sensor 51 and a counter 52. The sensor 51 can be a light sensor or a magnetic sensor, and is used to detect light emission or variation of magnetic force of the LEMP protector 11 and output a counting signal. The counter 52 receives the counting signal to count the action times of the LEMP protector 11. The counter 52 can remind the operator via data, text display or warning sound of whether the LEMP protector 11 has reached its time-limit of use has to be replaced. In this embodiment, another fast response protector 14 is added below the fast response protector 13 for compensation at middle frequencies because the total capacitance of the series-connected fast response protectors 13 and 14 becomes smaller, hence reducing and the insertion loss. A fuse 15 can also be added to avoid electrical accidents due to careless touch with naked power wires when installing an antenna.

Figure 5:
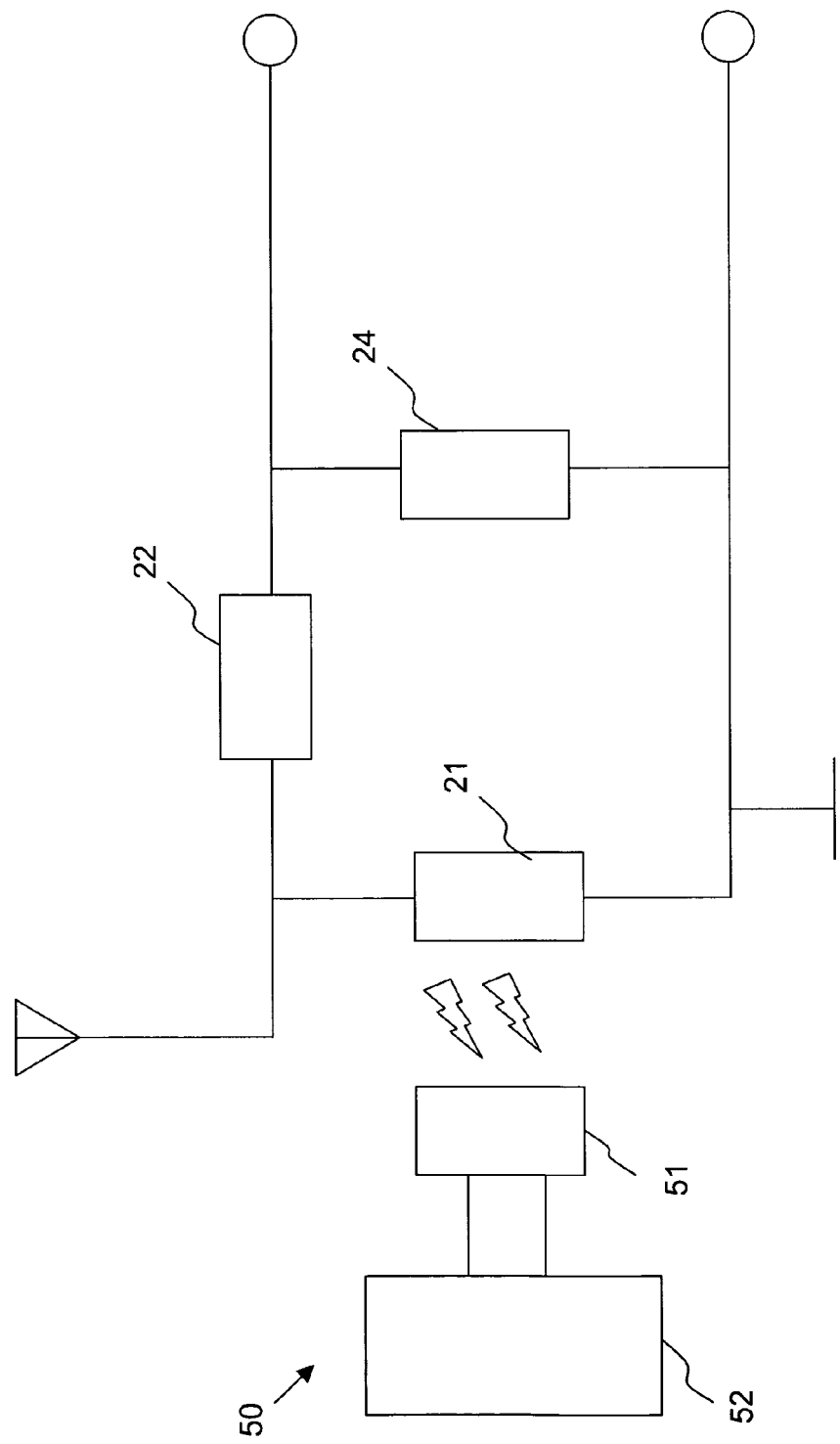
FIG. 5 and FIG. 6 are surge suppression circuit diagrams of an EMP protection circuit with resistive elements at different positions according to a second embodiment of the present invention.
Figure 6:
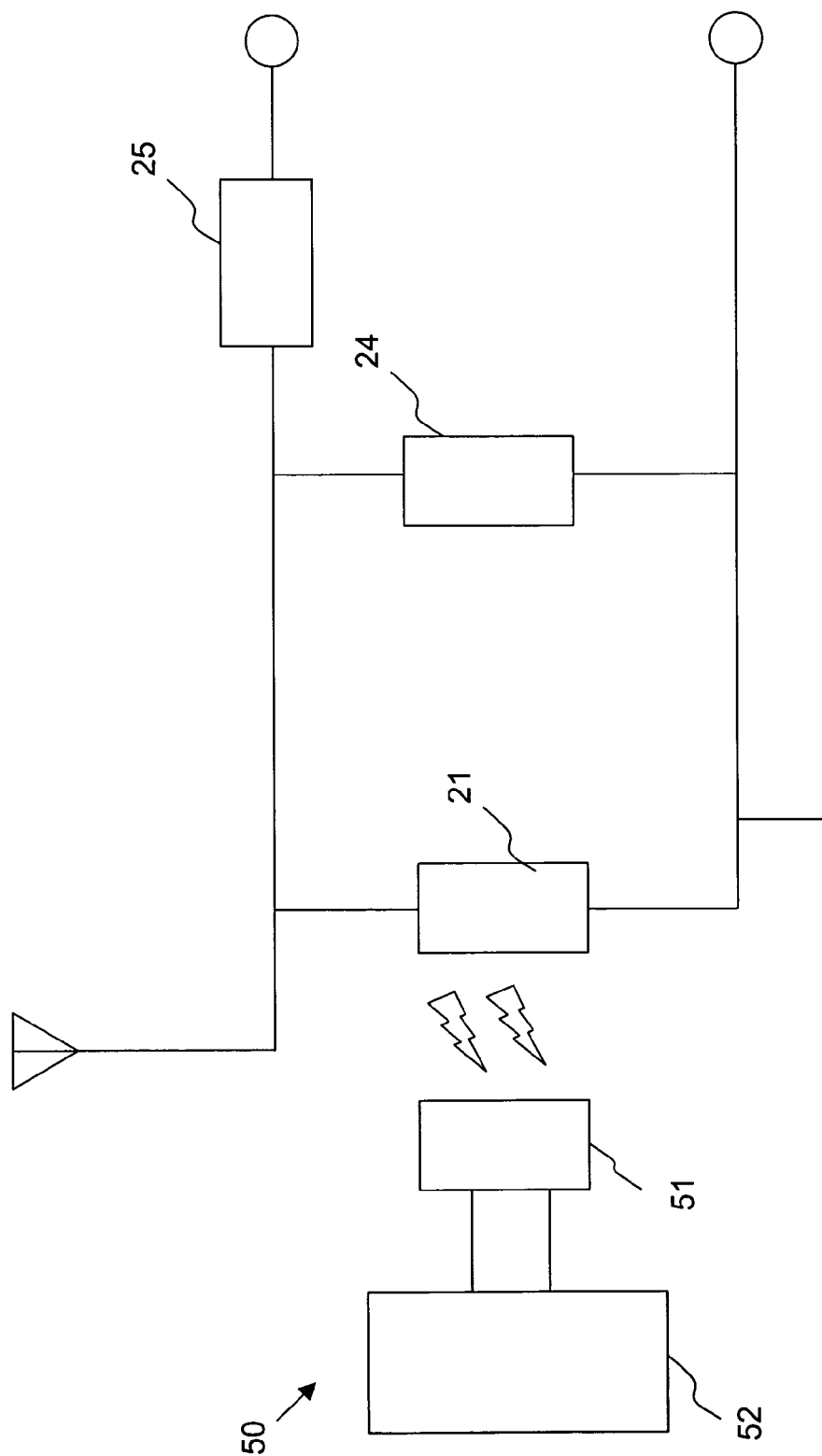

FIG. 5 is a surge suppression circuit diagram of an EMP protection circuit according to a second embodiment of the present invention. Reference is made to FIG. 5. A resistive element 22 is series connected between a high pass protection inductor 24 and an LEMP protector 21, and a counting circuit 50 is provided to count the action times of the LEMP protector 50. This embodiment makes use of a high frequency communication equipment to directly change the original low pass circuit architecture having protection capability to a high pass protection type. The high pass protection inductor 24 of the high frequency communication equipment directly adopts an inductor with inductance smaller than 10 nF. Because both the spectra of NEMP (nuclear EMP) and LEMP (lighting EMP) are smaller than 300 MHz, the high frequency communication equipment can directly use a small inductor to avoid insertion loss on one hand and discharge surge to ground on the other hand. In this situation, the resistive element can be moved to the rear area, or is properly distributed at two sides of the high pass protection inductor 24. As shown in FIG. 6, a resistive element 25 is disposed at the rear area. When a surge comes, $V_L = L \times dI/dt$. This voltage produced by inductive reactance is used to activate the front slow LEMP protector, and the resistive element 25 is used to protect rear-stage circuits.

Figure 7:
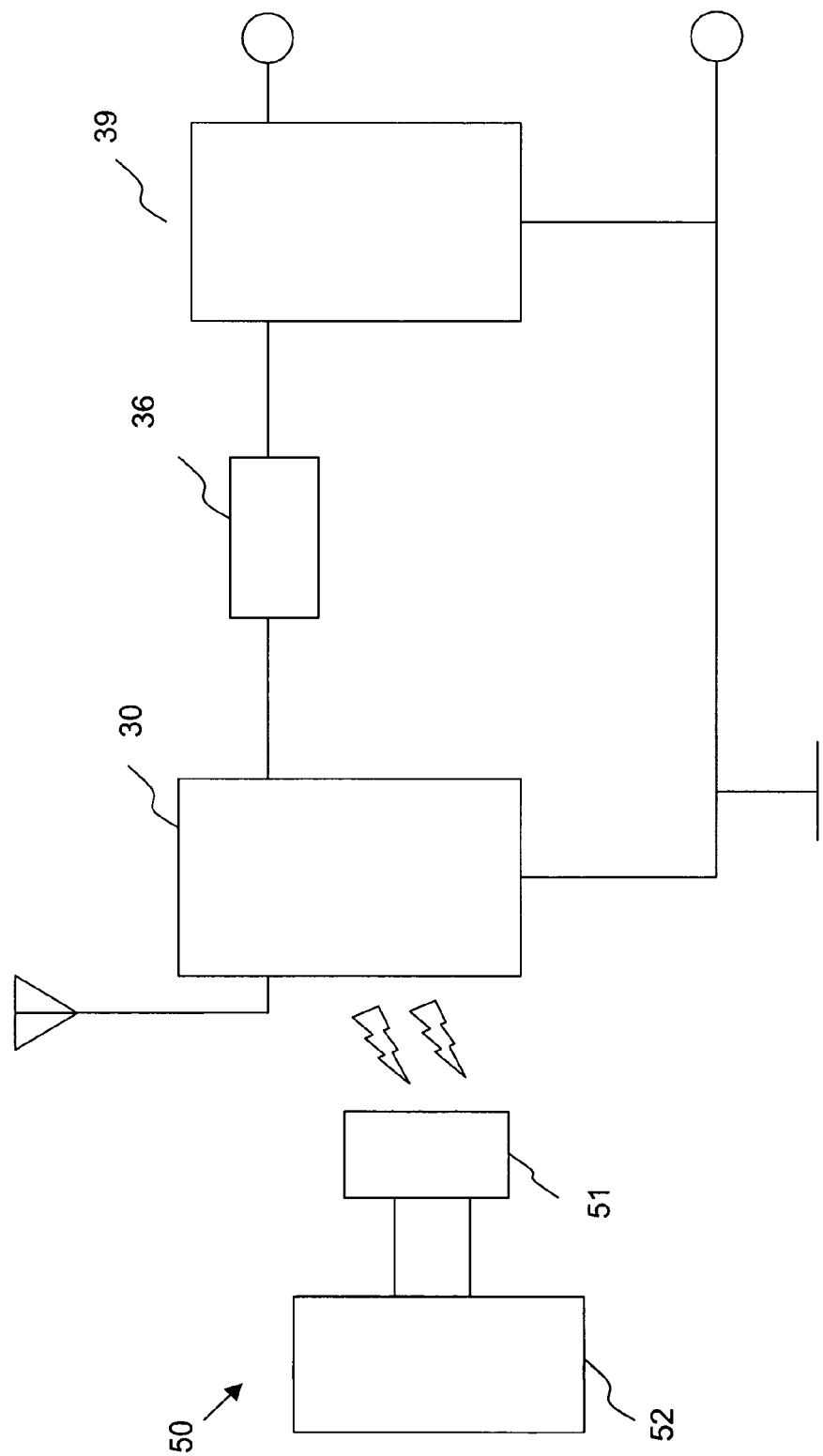
FIG. 7 is a surge suppression circuit diagram of an EMP protection circuit according to a third embodiment of the present invention.

FIG. 7 is a surge suppression circuit diagram of an EMP protection circuit according to a third embodiment of the present invention. Reference is made to FIG. 7. At least a capacitive reactance element 35 is series connected between a surge protection circuit 30 and a protected circuit 39, and a counting circuit 50 is provided at a detection position of the surge protection circuit 30 to count the action times of the surge protection circuit 30. The capacitive reactance element 36 is a varactor, whose capacitance varies with input voltage. Normally, the varactor has a high capacitance and thus a small impedance. The signal can be normally be passed to the communication system. When an abnormal high voltage (EMP) occurs in the system, the capacitance of the varactor will automatically decrease to have a high impedance, hence preventing from damaging the system. That is, this EMP protection circuit with a counter first fast activates the protection circuit 30, and ensures that EMP will be blocked by the capacitive reactance element and won't affect the communication system 36. The varactor can be of a metal/semiconductor/metal (MSM) structure or of a metal/insulator/semiconductor/insulator/metal (MISIM) structure.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

We claim:

1. An EMP protection circuit with a counter comprising:
   a surge protection circuit;
   at least a capacitive reactance element series connected between said surge protection circuit and a protected circuit, wherein said capacitive reactance element includes a varactor; and
   a counting circuit disposed at a detection position of said surge protection circuit and comprising a sensor and a counter, said sensor detecting said surge protection circuit and outputting a counting signal, said counter receiving said counting signal and then counting action times of said surge protection circuit.

2. The EMP protection circuit with a counter of claim 1, wherein said sensor is a light sensor for detecting light emission of said surge protection circuit.

3. The EMP protection circuit with a counter of claim 1, wherein said sensor is a magnetic sensor for detecting variation of magnetic force of said surge protection circuit.

4. The EMP protection circuit with a counter of claim 1, wherein said varactor is of a metal/semiconductor/metal (MSM) structure or a metal/insulator/semiconductor/insulator/metal (MISIM) structure.

5. The EMP protection circuit with a counter of claim 1, wherein said surge protection circuit is at least composed of one stage of LEMP protection circuit and more than one stage of fast response protection circuit.

6. The EMP protection circuit with a counter of claim 5, wherein a resistive element is series connected between said LEMP protection circuit and said fast response protection circuit.

7. The EMP protection circuit with a counter of claim 5, wherein said fast response protection circuit includes a plurality of series-connected ESD elements.

8. The EMP protection circuit with a counter of claim 5, wherein said fast response protection circuit includes an ESD element and a capacitive compensating element that are series connected together.

9. The EMP protection circuit with a counter of claim 5, wherein said fast response protection circuit includes a capacitive compensating element.

10. The EMP protection circuit with a counter of claim 5, wherein a fuse is further series connected after said LEMP protection circuit and said fast response protection circuit.

11. The EMP protection circuit with a counter of claim 5, wherein a resistive element is further series connected after said LEMP protection circuit and said fast response protection circuit.

12. An EMP protection circuit with a counter comprising:
    at least one stage of LEMP protection circuit and more than one stage of fast response protection circuit with resistive elements series connected between them; and
    a counting circuit disposed at a detection position of said LEMP protection circuit and comprising a sensor and a counter, said sensor detecting said LEMP protection circuit and outputting a counting signal, said counter receiving said counting signal and then counting action times of said LEMP protection circuit.

13. The EMP protection circuit with a counter of claim 12, wherein said sensor is a light sensor for detecting light emission of said LEMP protection circuit.

14. The EMP protection circuit with a counter of claim 12, wherein said sensor is a magnetic sensor for detecting variation of magnetic force of said LEMP protection circuit.

15. The EMP protection circuit with a counter of claim 12, wherein a fuse is further series connected after said fast response protection circuit and said resistive elements.

16. The EMP protection circuit with a counter of claim 12, wherein said fast response protection circuit includes a plurality of series-connected ESD elements.

17. The EMP protection circuit with a counter of claim 12, wherein said fast response protection circuit includes an ESD element and a capacitive compensating element that are series connected together.

18. The EMP protection circuit with a counter of claim 12, wherein said fast response protection circuit includes a capacitive compensating element.

19. An EMP protection circuit with a counter comprising:
at least one stage of LEMP protection circuit and more than one stage of fast response protection circuit with resistive element series connected after them; and
a counting circuit disposed at a detection position of said LEMP protection circuit and comprising a sensor and a counter, said sensor detecting said LEMP protection circuit and outputting a counting signal, said counter receiving said counting signal and then counting action times of said LEMP protection circuit.

20. The EMP protection circuit with a counter of claim 19, wherein said sensor is a light sensor for detecting light emission of said LEMP protection circuit.

21. The EMP protection circuit with a counter of claim 19, wherein said sensor is a magnetic sensor for detecting variation of magnetic force of said LEMP protection circuit.

22. The EMP protection circuit with a counter of claim 19, wherein said fast response protection circuit includes a plurality of series-connected ESD elements.

23. The EMP protection circuit with a counter of claim 19, wherein said fast response protection circuit includes an ESD element and a capacitive compensating element that are series connected together.

24. The EMP protection circuit with a counter of claim 19, wherein said fast response protection circuit includes a capacitive compensating element.

\* \* \* \* \*